United States Patent [19]

Goyne

[11] Patent Number: 4,632,648
[45] Date of Patent: Dec. 30, 1986

[54] GREASE PUMPS

[76] Inventor: Thomas S. Goyne, Box 75, Helfenstein, Pa. 17939

[21] Appl. No.: 748,329

[22] Filed: Jun. 24, 1985

[51] Int. Cl.⁴ .................. F04B 39/08; F04B 9/04; F16N 25/04
[52] U.S. Cl. .................. 417/502; 417/519 D; 92/130 R; 184/35
[58] Field of Search .................. 184/7.4, 35; 417/502, 417/510, 519, 440; 92/130 R, 129

[56] References Cited

U.S. PATENT DOCUMENTS

| | | | |
|---|---|---|---|
| 1,211,976 | 12/1914 | Chawdler | 184/35 |
| 1,738,735 | 12/1929 | Scoville | 184/35 |
| 1,862,164 | 7/1932 | Sheppard | 184/35 |
| 2,327,587 | 9/1943 | Wiessner | 286/19 |
| 2,340,625 | 2/1944 | Stern | 221/47 |
| 2,363,653 | 11/1944 | Crossman | 417/519 |
| 2,481,856 | 9/1949 | Medhaug | 184/35 |
| 2,561,785 | 7/1951 | Davis | 184/27 |
| 2,581,786 | 7/1951 | Davis | 417/502 |
| 2,619,192 | 11/1952 | Lending | 184/35 |
| 2,765,050 | 10/1956 | Klein | 184/27 |
| 2,773,562 | 12/1956 | Thomas | 184/27 |
| 2,787,336 | 4/1957 | Thomas | 184/27 |
| 2,826,267 | 3/1958 | Lipinski | 184/27 |
| 2,873,003 | 2/1959 | Meinelt | 184/27 |
| 3,046,894 | 7/1962 | Machen | 92/130 R |
| 3,084,763 | 4/1963 | Thomas | 184/27 |
| 3,092,037 | 6/1963 | Rhodes | 417/440 |
| 3,127,954 | 4/1964 | Callahan et al. | 184/7 |
| 3,219,146 | 11/1965 | Leese et al. | 184/7 |
| 3,229,786 | 1/1966 | Robson et al. | 184/7 |
| 3,263,609 | 8/1966 | Bystricky et al. | 103/23 |
| 3,371,745 | 3/1968 | Callahan et al. | 184/7 |
| 3,422,926 | 1/1969 | Stanaway | 184/7 |
| 3,590,956 | 7/1971 | Obergefell | 184/7 |
| 3,595,340 | 7/1971 | Obergefell | 184/27 |
| 3,674,112 | 7/1972 | Roberts | 184/6 |
| 3,707,203 | 12/1972 | Roberts | 184/6 |
| 3,938,425 | 2/1976 | Kroffke | 92/60.5 |
| 3,972,387 | 8/1976 | Braun | 184/28 |
| 3,995,717 | 12/1976 | Kroffke | 184/7 |
| 4,099,597 | 7/1978 | Powell et al. | 184/27 |
| 4,105,094 | 8/1978 | Callahan | 184/7 |
| 4,195,970 | 4/1980 | Zalis | 417/269 |
| 4,236,881 | 12/1980 | Pfleger | 417/502 |
| 4,435,134 | 3/1984 | Okada | 417/440 |

FOREIGN PATENT DOCUMENTS 386131 1/1933 United Kingdom .................. 184/35

Primary Examiner—Carlton R. Croyle
Assistant Examiner—Theodore W. Olds
Attorney, Agent, or Firm—Buell, Ziesenheim, Beck & Alstadt

[57] ABSTRACT

A high pressure low volume grease pump is provided having a pump and a surrounding distributor adapted for sequentially distributing grease to a plurality of outlets and a reservoir delivering grease to the pump and receiving grease from any outlet not connected to a gland.

5 Claims, 3 Drawing Figures

GREASE PUMPS

This invention relates to grease pumps and more particularly to grease pumps for providing sequential feed of accurately measured amount of grease under pressure to one or more mechanisms.

Typical of mechanisms which require a relatively accurate periodic delivery of grease under pressure, is the rotary shaft of a slurry pump which rotates through a seal and bearing in a slurry which can be highly abrasive. A solution to the problem of ingress of slurry fluid into the bearing is that of introducing grease under pressure around the bearing and permitting it to slowly escape through the seal around the bearing to prevent ingress of slurry. This requires that grease be delivered to the bearing cavity behind the seal at such regular intervals that the pressure of the grease always remains higher than that of the slurry.

There are many lubricant pumps presently available on the market designed to deliver lubricant under pressure. Typically these pumps have a barrel type cam designed to convert rotary to reciprocal motion to drive a piston or plunger. Such pumps have, of necessity, generally been sized to deliver the full feed of the pump at the full speed of the rotary drive. There were no rotary speed reduction means or means for providing controlled sequential feed out of such pumps. Such pumps also had the problem of pulsating. Typical of such pumps are those shown in U.S. Pat. No. 3,323,461 and in U.S. Pat. No. 3,612,727. An attempt to overcome these problems was made by the structure described in U.S. Pat. No. 4,195,970. Another problem was that of controlling the sequential delivery of lubricant to avoid waste and yet provide that amount of lubricant necessary for effective operation. In the past, it was attempted to solve this problem by varying the pump stroke as in U.S. Pat. No. 3,139,156 or in U.S. Pat. No. 4,099,597. Such devices become complex and expensive and lack the simplicity and positive operation which is desirable in such pump.

The present invention is directed to a grease pump of relatively simple construction which, using a single piston, can deliver a preselected amount of grease to one or a plurality of apparatus sequentially and in very accurate amounts at high pressure. Typical of such applications is a high pressure pump for capacities of as little as one-half pint of lubricant to be pumped in eight hours against pressures up to 500 psi.

I provide a grease pump apparatus which comprises a drive housing having a shaft rotatably journaled therein, drive means for rotating said shaft at a preselected speed eccentric drive means on said shaft intermediate its ends, a pump housing fixed to said drive housing, a cylindrical distributor in said pump housing rotatable in a well in said pump housing on an axis transverse to said shaft, drive connecting means connecting said drive shaft and distributor for rotation of the distributor, a plurality of discharge passages in said housing circumferentially spaced around the distributor for sequentially receiving grease under pressure from the distributor, a cylindrical axial passage extending through the distributor, a piston axially movable in said cylindrical axial passage having one end operatively engaging said eccentric drive means on the shaft and the other end having a reciprocable movable pump piston, a pump barrel surrounding said pump piston, passage means delivering grease under pressure from said pump barrel to said cylindrical distributor, a grease reservoir supplying grease to said pump barrel and manifold means connecting at least one of said plurality of discharge passages with at least one gland to be pressurized and connecting the remaining discharge passages with the grease reservoir. Preferably the drive means for rotating the drive shaft is an electric motor and gear reducer. The eccentric drive means on the shaft is preferably a cam rotatable with the shaft. The drive connecting means connecting the drive shaft and distributor for rotating the distributor is preferably a stub shaft axially integral with the distributor and carrying a first spur gear in the drive housing driven by a second spur gear fixed on a shaft which is driven at right angles to the drive shaft by miter gears. Preferably the pump barrel is integrally formed on an end cap for the pump housing and is surrounded by a well in said cap carrying a resilient means such as a spring acting on the pump piston normally urging it toward the eccentric drive means. The distributor is preferably provided with an annular leakage collection groove connected to the grease reservoir for returning leakage to the reservoir.

In the foregoing general description of this invention I have set out certain objects, purposes and advantages of my invention. Other objects, purposes and advantages of this invention will be apparent from a consideration of the following description and the accompanying drawings in which.

Figure 1:
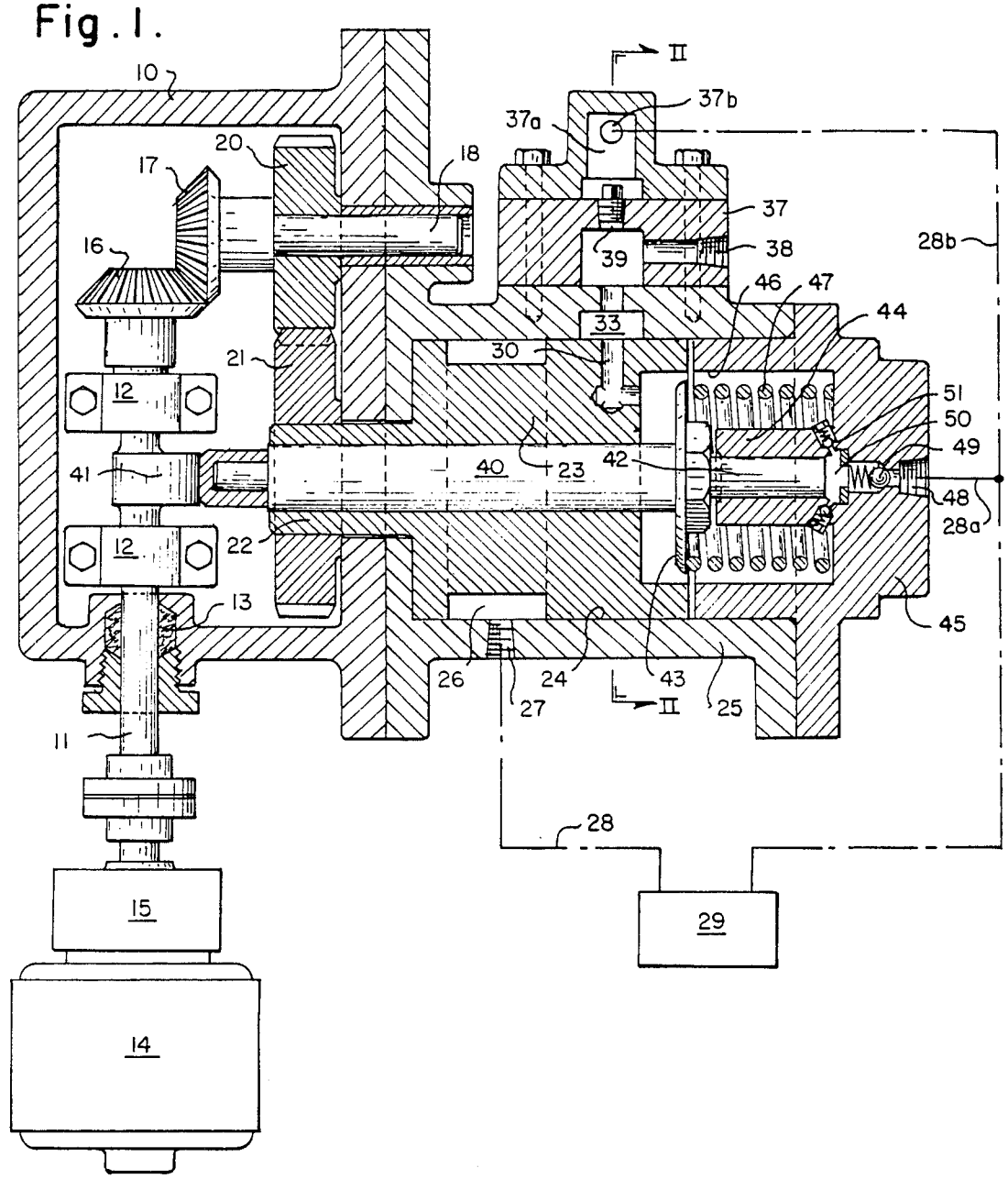
FIG. 1 is a sectional view, partly in elevation of a pump assembly according to this invention.
Figure 2:
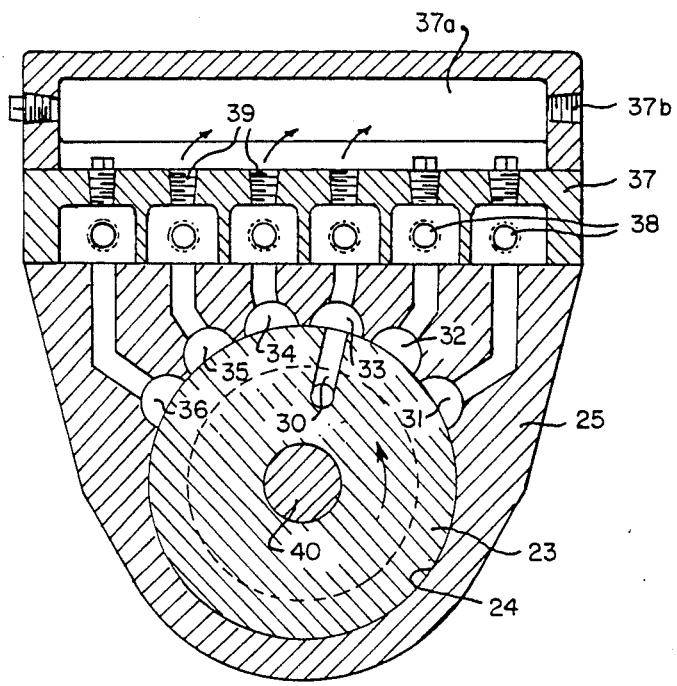
FIG. 2 is a section on the line II—II of FIG. 1.
Figure 3:
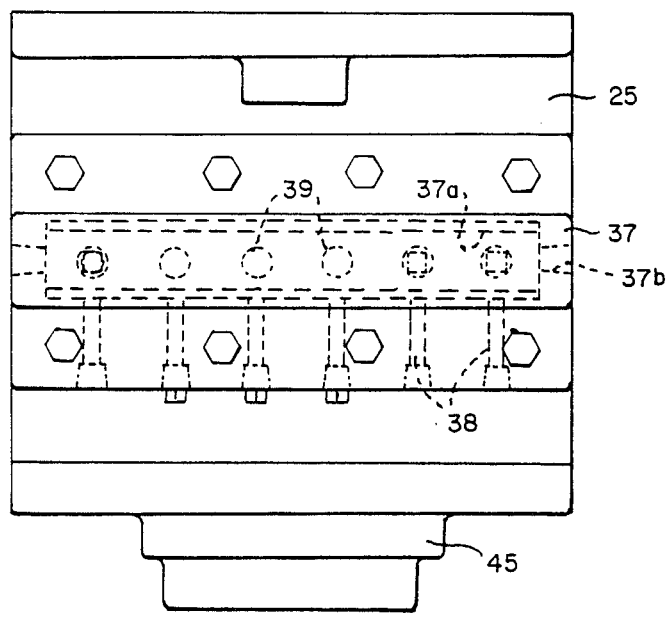
FIG. 3 is a top plan view of the manifold of FIG. 1.

Referring to the drawings I have illustrated a drive housing 10 having a longitudinal shaft 11 journaled in pillow blocks 12 in the housing and having one end extending out of housing 10 through a stuffing box or gland 13. Shaft 11 is driven by motor 14 through gear box 15.

The opposite end of shaft 11 is provided with a miter gear 16 which engages and drives a miter gear 17 on one end of a transverse shaft 18 while the other end of shaft 18 is journaled in housing 10. A spur gear 20 is fixed on shaft 18 to rotate therewith and drivingly engages spur gear 21 which is fixed on a stub shaft 22 integrally mounted on the axis of grease distributor 23. Grease distributor 23 is mounted for rotation in a well 24 of pump housing 25 connected to drive housing 10. The distributor 23 preferably has an annular grease leakage channel 26 surrounding its periphery and discharging to outlet 27 which is connected by line 28 to a grease reservoir 29. The distributor 23 is also provided with a grease discharge passage 30 which extends from its end face opposite the stub shaft 22. The grease discharge passage sequentially opens into a plurality of discharge passages 31, 32, 33, 34, 35 and 36 spaced around the periphery of well 24. These discharge passages in turn open into a discharge manifold 37 which is bolted onto housing 25. Manifold 37 has a pair of discharge ports for each discharge passage. One passage 38 is designed to be connected to a gland to be lubricated and pressurized. The other passage 39, preferably at right angles to passage 38 opens into a longitudinal discharge passage 37a connected to reservoir 29 through port 37b and line 28b. Each of passages 38 and 39 can be closed by a pipe plug leaving the other open, depending on the result desired.

The stub shaft 22 and distributor 23 are provided with an axially reciprocable shaft 40 which is driven at one end by an eccentric cam 41 intermediate the ends of shaft 11. The other end of shaft 40 is threaded to receive plunger 42 having an annular radial shoulder 43. The plunger 42 is reciprocable in a barrel 44 carried by a cover 45 which closes well 24 of pump housing 25. Barrel 44 is surrounded by an open area 46 into which a spring 47 is inserted to press against shoulder 43 to normally urge the shaft 40 toward eccentric cam 41. The end of barrel 44 opposite distributor 23 is provided with an inlet opening 48 and check valve 49 connected to line 28a and with outlet pump 50 with check valve 51 for delivering fluid to open area 46 and thence to grease discharge passage 30 of distributor 23.

In operation, the motor 14 drives shaft 11 through gear box 14. Shaft 11 in turn drives eccentric cam 41 for reciprocation of shaft 40 and, through miter gears 16, 17, shaft 18 and gears 20, 21, drives distributor 23 for rotation. Cam 41 drives shaft 40 and plunger 42 against spring 47. Plunger 42 on moving into barrel 44 forces grease out of outlet passages or openings 50 and through passage 30 in the distributor into sequential discharge passages 31–36. On returning out of barrel 44, plunger 42 draws grease through inlet opening 48. This sequence is repeated at controlled rate to maintain a slow, high pressure feed to each of the discharge passages. If any of the discharge passages is not being used to deliver grease it is diverted to reservoir 29.

In the foregoing specification I have set out certain objects, purposes and advantages of this invention, however, it will be understood that this invention may be otherwise embodied within the scope of the following claims.

I claim:

1. A high pressure grease pump for pumping grease at low volumes over extended periods comprising a drive housing, a shaft rotatably journaled therein, drive means for rotating said shaft at a preselected speed, eccentric drive means in said shaft intermediate its ends, a pump housing fixed to said drive housing, a cylindrical distributor in said pump housing rotatable in a well in said pump housing on an axis transverse to said shaft, drive connecting means connecting said drive shaft and distributor for rotation of the distributor, a plurality of discharge passages in said housing circumferentially spaced around the distributor for sequentially receiving grease under pressure from the distributor, a cylindrical axial passage extending through the distributor, a piston axially movable in said cylindrical axial passage having one end operatively engaging said eccentric drive means on the shaft and the other end having a reciprocably movable pump piston, a pump barrel surrounding said pump piston, passage means delivering grease under pressure from said pump barrel to said cylindrical distributor, a grease reservoir supplying grease to said pump barrel and manifold means connecting at least one of said plurality of discharge passages with at least one gland to be pressurized and said manifold means connecting the remaining discharge passages which are not connected to a gland to be returned with the grease reservoir, wherein the pump barrel is integrally formed on an end cap for the pump housing and is surrounded by a well in said cap having resilient means acting on the pump piston normally urging it toward the eccentric drive means.

2. A high pressure grease pump for pumping grease at low volumes over extended periods comprising a drive housing, a shaft rotatably journaled therein, drive means for rotating said shaft at a preselected speed, eccentric drive means in said shaft intermediate its ends, a pump housing fixed to said drive housing, a cylindrical distributor in said pump housing rotatable in a well in said pump housing on an axis transverse to said shaft, drive connecting means connecting said drive shaft and distributor for rotation of the distributor, a plurality of discharge passages in said housing circumferentially spaced around the distributor for sequentially receiving grease under pressure from the distributor, a cylindrical axial passage extending through the distributor, a piston axially movable in said cylindrical axial passage having one end operatively engaging said eccentric drive means on the shaft and the other end having a reciprocably movable pump piston, a pump barrel surrounding said pump piston, passage means delivering grease under pressure from said pump barrel to said cylindrical distributor, a grease reservoir supplying grease to said pump barrel and manifold means connecting at least one of said plurality of discharge passages with at least one gland to be pressurized and said manifold means connecting the remaining discharge passages which are not connected to a gland to be returned with the grease reservoir, wherein the distributor means has an annular leakage groove connected to the grease reservoir for returning leakage from the pump to said reservoir.

3. A grease pump as claimed in claim 1 or 2 wherein the drive means for rotating the drive shaft is an electric motor and gear reducer.

4. A grease pump as claimed in claim 1 or 2 wherein the eccentric drive means on the drive shaft is a cam fixed on and rotatable with the drive shaft.

5. A grease pump as claimed in claim 1 or 2 wherein the drive connection means connecting the drive shaft and distributor includes a stub shaft on the distributor axially integral with the distributor and driven by gear means from the drive shaft.

* * * * *